Inventors
William A. Turunen &
Patrick W. O'Connell, deceased
by Elaine C. O'Connell, Administratrix
By Willits, Helwig & Baillio
Attorneys

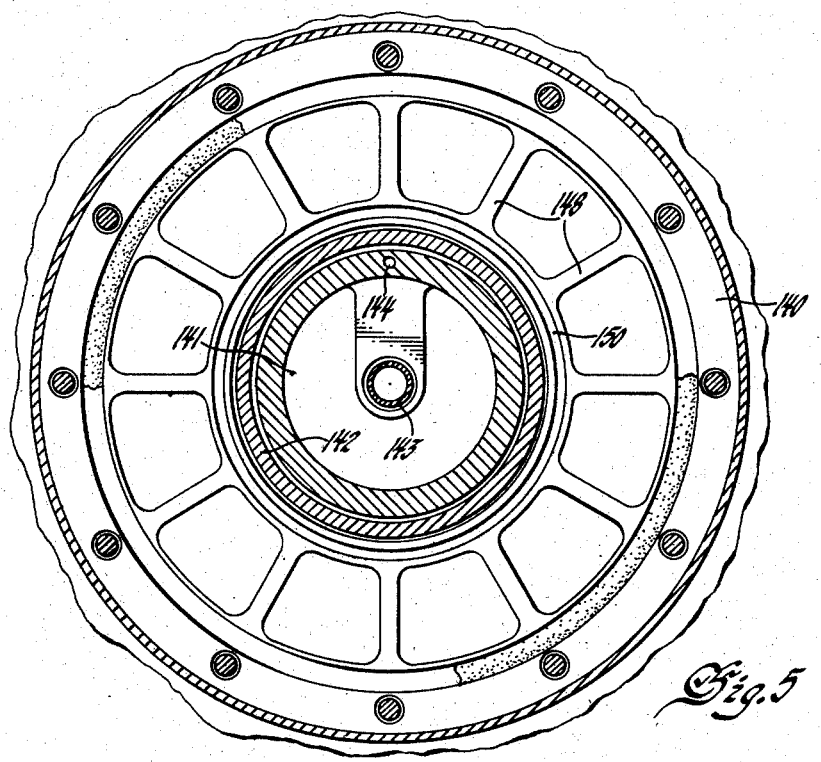
Fig. 5
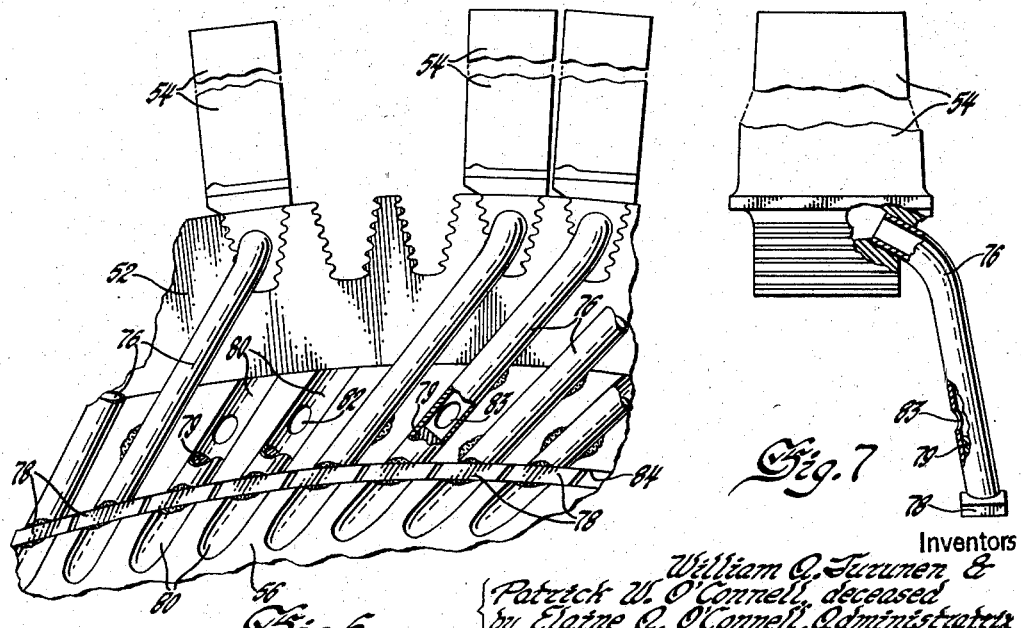
Fig. 6
Fig. 7
Inventors
William A. Turunen &
Patrick W. O'Connell, deceased
by Elaine C. O'Connell, Administratrix
By Willits, Helwig & Baillio
Attorneys April 21, 1959  W. A. TURUNEN ET AL  2,883,152
EVAPORATIVE COOLED TURBINE
Filed Jan. 19, 1953  6 Sheets-Sheet 6

Inventors
William A. Turunen &
Patrick W. O'Connell, deceased
by Elaine O. O'Connell, Administratrix
By Willits, Helwig & Baillio
Attorneys United States Patent Office 2,883,152
Patented Apr. 21, 1959

2,883,152

EVAPORATIVE COOLED TURBINE

William A. Turunen, Birmingham, Mich., and Patrick W. O'Connell, deceased, late of Royal Oak, Mich., by Elaine A. O'Connell, administratrix, Royal Oak, Mich., assignors to General Motors Corporation, Detroit, Mich., a corporation of Delaware Application January 19, 1953, Serial No. 331,992

8 Claims. (Cl. 253—39.15)

This invention relates to turbine cooling and more particularly to an evaporative cooling system for the turbine buckets of a high temperature turbine.

An object of this invention is to provide the turbine buckets of a high temperature turbine with a closed evaporative cooling system.

Another object of this invention is to provide a turbine wheel having mechanically fastened buckets with an evaporative cooling system without adversely affecting the structural strength of the turbine wheel.

Further objects and advantages of the present invention will be apparent from the following description, reference being had to the accompanying drawings wherein a preferred form of the present invention is clearly shown.

In the drawings:

Figure 5 is a sectional view taken substantially on the plane indicated by the line 5—5 of Figure 4;

Figure 6 is an enlarged partial elevation of the rear face of the auxiliary wheel and turbine wheel assembly;

Figure 7 is an enlarged elevation, partially in section, of a turbine bucket assembly;

Figure 1:
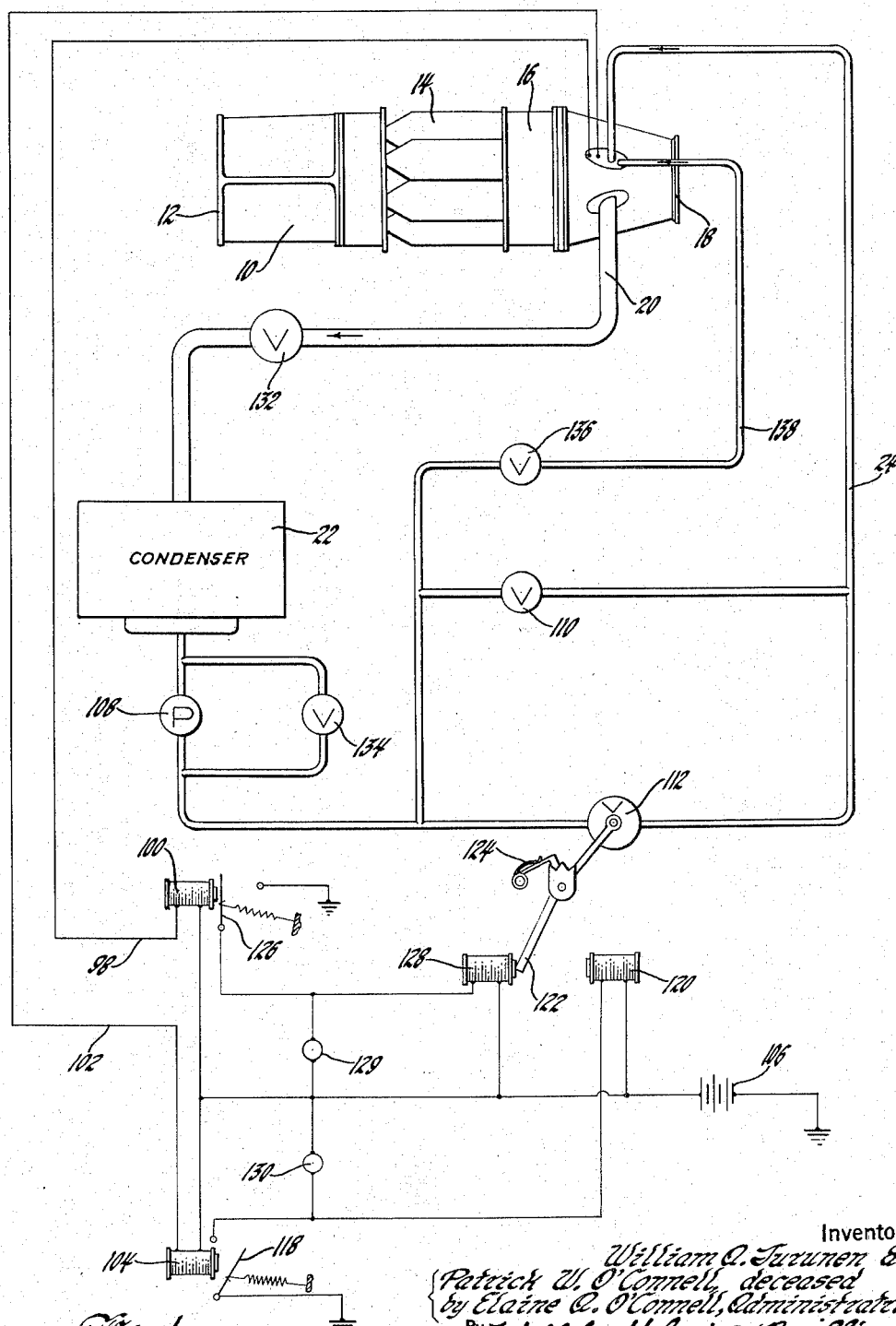
Figure 1 is a schematic illustration of a turbojet engine, a closed evaporative cooling system for the turbine buckets of the engine, and an electrical control arrangement for regulating the flow of coolant in the system.

Referring now to the drawings in detail and more particularly to Figure 1, the liquid cooling arrangement of the invention is shown as applied to a turbojet engine of conventional design such as is commonly used for powering high speed aircraft. The engine includes a compressor 10, having an air intake 12, which discharges into the combustion chambers 14. Fuel is suitably supplied to the combustion chambers 14 and the products of combustion are utilized to drive the turbine 16 which drives the compressor 10. The combustion products exhaust through the jet nozzle 18 after passing through the turbine 16 and furnish the motive power for the aircraft.

The turbine 16 includes a turbine rotor assembly (that will be shown in detail in the succeeding figures) wherein a suitable liquid coolant, such as water, may be equally distributed to an annular row of turbine buckets by a series of circumferentially spaced transfer tubes that lead from a common annular vaporizing chamber. The liquid coolant in the turbine buckets is heated by the combustion products that drive the turbine, and the resulting coolant vapor is led from the vaporizing chamber of the turbine rotor assembly by the conduit 20 to a condenser 22. The coolant is cooled to its liquid state in the condenser 22 and is returned to the vaporizing chamber of the turbine rotor assembly for distribution to the turbine buckets by a conduit 24. Any suitable cooling medium may be utilized to extract heat from the coolant in the condenser, such as atmospheric air, which may be supplied by the ram effect of motion of the aircraft.

Figure 2:
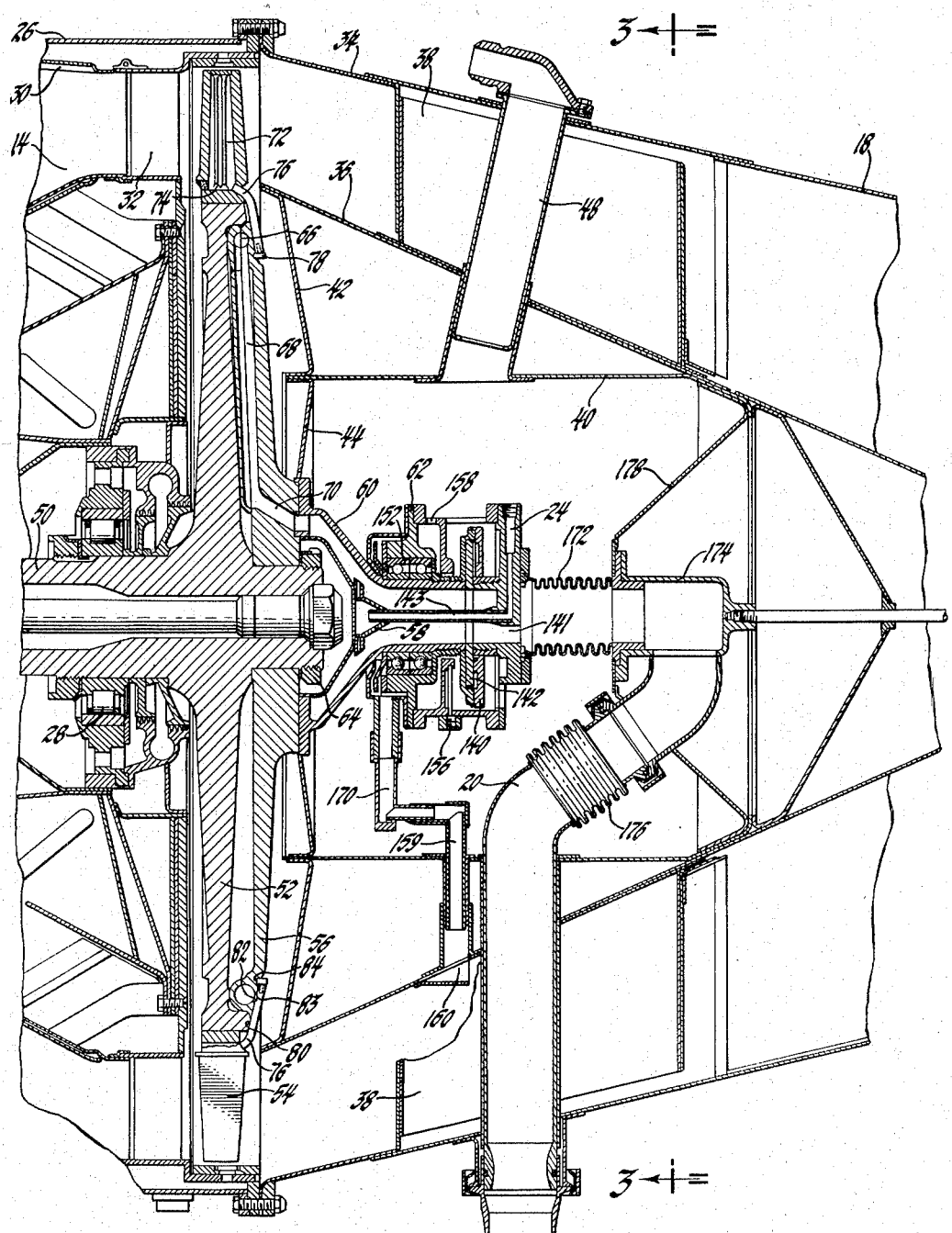
Figure 2 is a sectional view through the axis of the turbine portion of the turbojet engine of Figure 1 that illustrates the general arrangement of the turbine wheel and auxiliary wheel assembly of the invention, and a spin seal assembly therefor.
Figure 3:
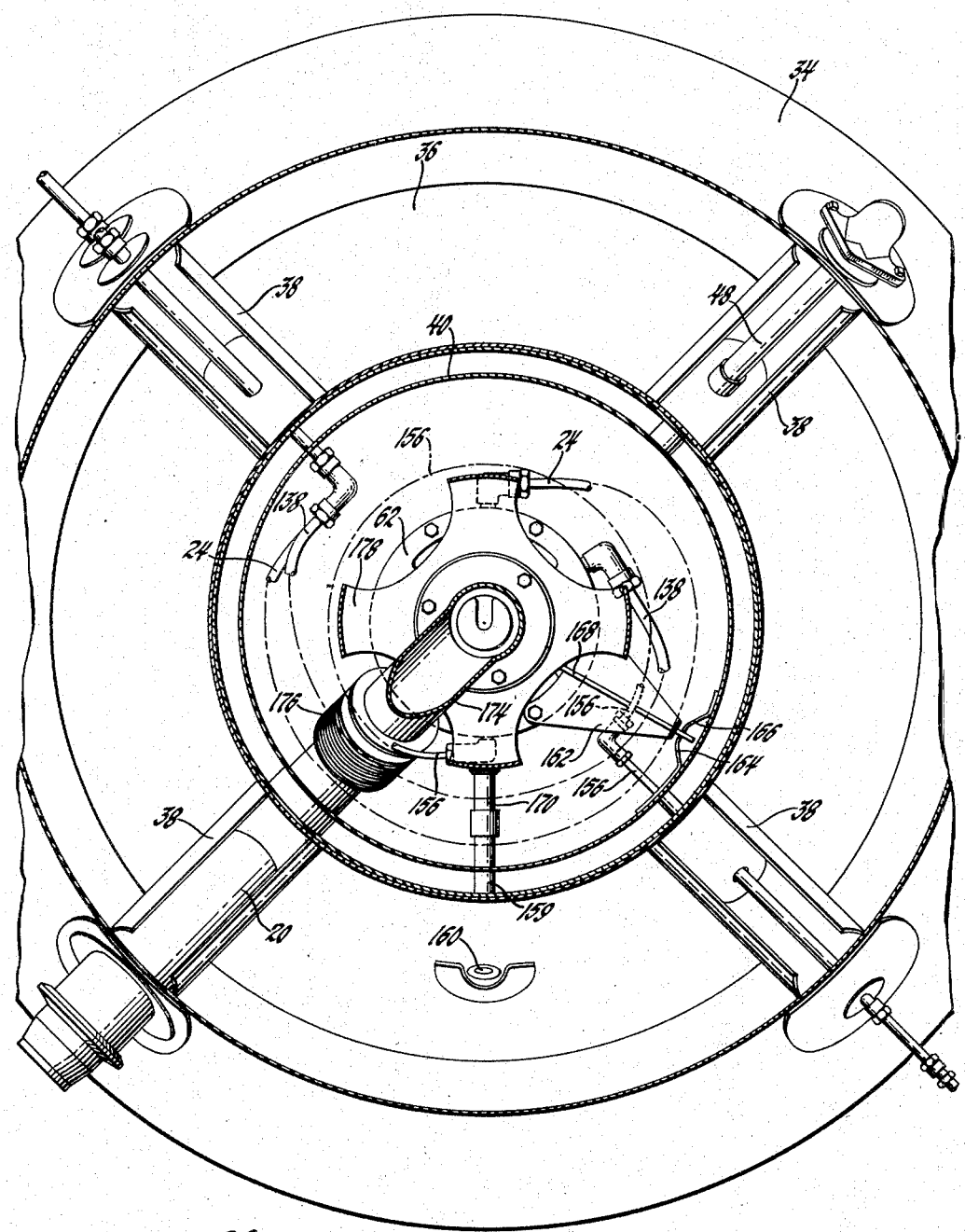
Figure 3 is a sectional view taken substantially on the plane indicated by the line 3—3 of Figure 2.
Figure 4:
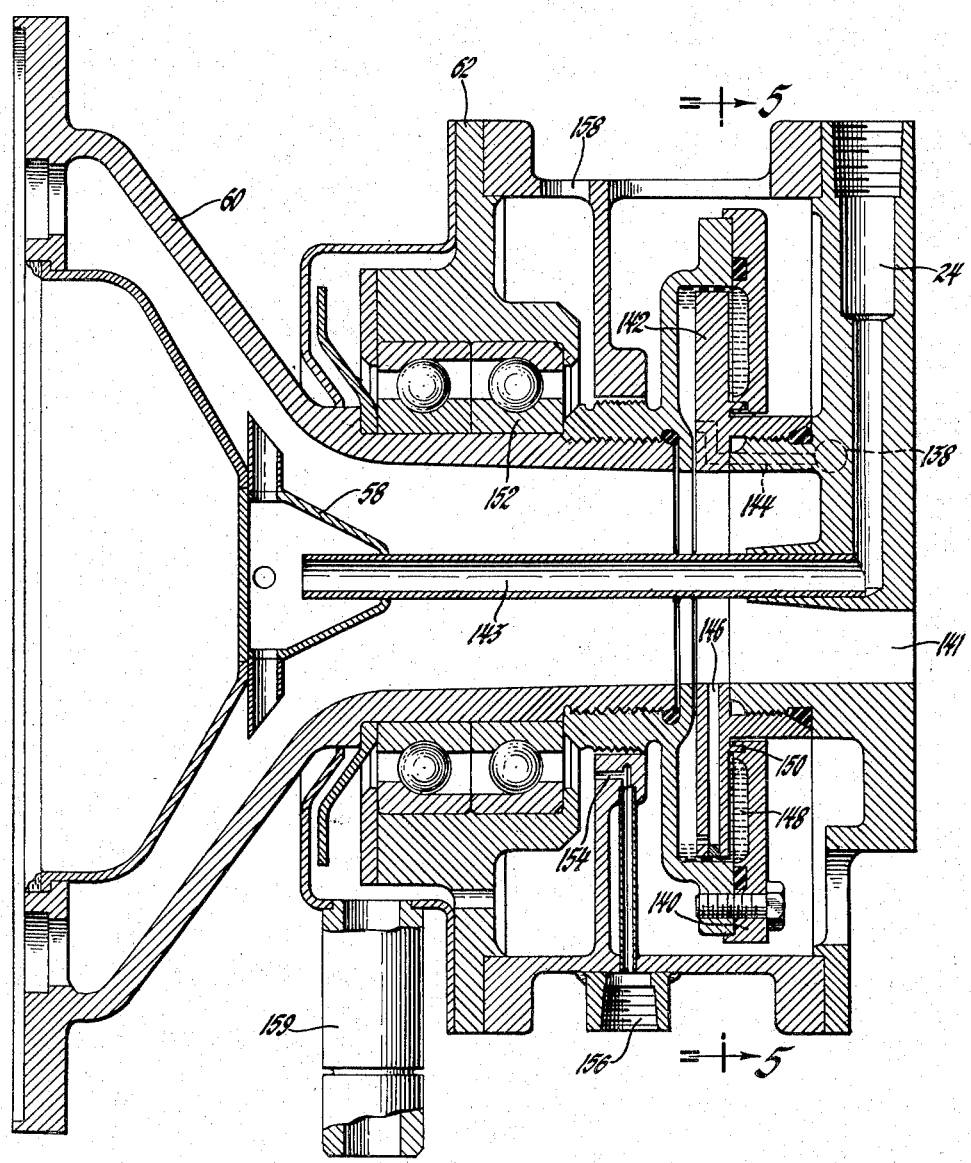
Figure 4 is an enlarged section of the spin seal assembly.
Figure 8:
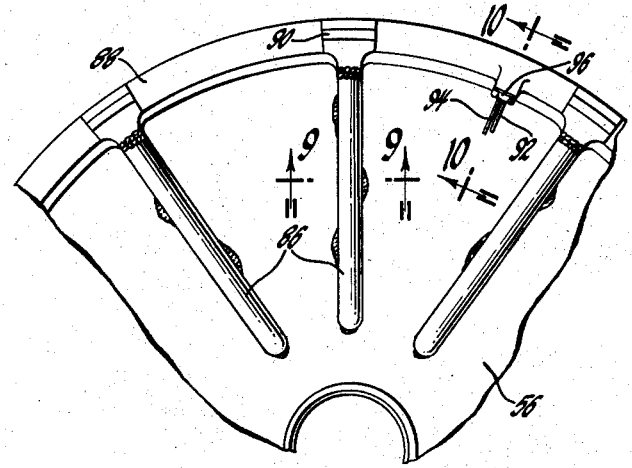
Figure 8 is an enlarged partial elevation of the front face of the auxiliary wheel.
Figure 9:
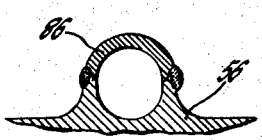
Figure 9 is a partial section taken on the plane indicated by the line 9—9 of Figure 8.
Figure 10:
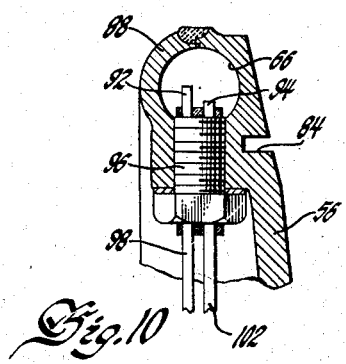
Figure 10 is a partial section taken on the plane indicated by the line 10—10 of Figure 8.

Referring now to Figure 2, the turbine rotor assembly is supported for rotation in the annular casing 26 by the bearing 28. The casing 26 encloses and supports the outlet tubes 30 of the combustion chambers 14 which feed the products of combustion through the nozzle vane ring assembly 32. An exhaust duct or cone 34 terminates in the jet nozzle 18 and is bolted to the rear face of the casing 26. A tail cone 36 is supported within the duct 34 by four circumferentially spaced hollow telescopic struts 38 and an annular motive fluid exhaust path is thereby formed between the cones. A cylindrical casing 40 is supported in the cone 36. An annular disk 42 connects the forward edges of the cone 36 and the casing 40 in axially spaced relation with respect to the rear face of the turbine rotor. A second annular disk 44 is secured within the casing 40 to form a hollow chamber to which cooling air is introduced by a conduit 48 from any suitable source, as for example, the compressor 10. The inner edge of the disk 44 is radially spaced from the rear hub portion of the turbine rotor assembly so that this cooling air may be directed outwardly over the rear face of the turbine rotor assembly.

The turbine rotor assembly comprises a rotatable shaft 50, the turbine wheel or disk 52, the turbine buckets 54, the coolant distributing auxiliary wheel 56, the liquid coolant slinger 58, the coolant passage adapter 60, and the rotating members of the spin seal assembly 62. The auxiliary wheel 56 is mounted on the rear end of the shaft 50 and is secured against the rear face of the turbine wheel 52 by a nut 64. The auxiliary wheel 56 is provided with a ring-like vaporizing chamber 66 within its rim. The chamber 66 is connected by the radial passages 68 and the longitudinal passages 70 to the central coolant passage adapter 60 which forms an annular inner coolant chamber and which is suitably secured to the auxiliary wheel. The turbine buckets 54 have their root portions mechanically fastened to the peripheral rim of the turbine wheel disk 52 in any suitable fashion; for example, they may be affixed to the rim by a conventional fir tree interlock as is best illustrated in Figures 6 and 7.

Figure 11:
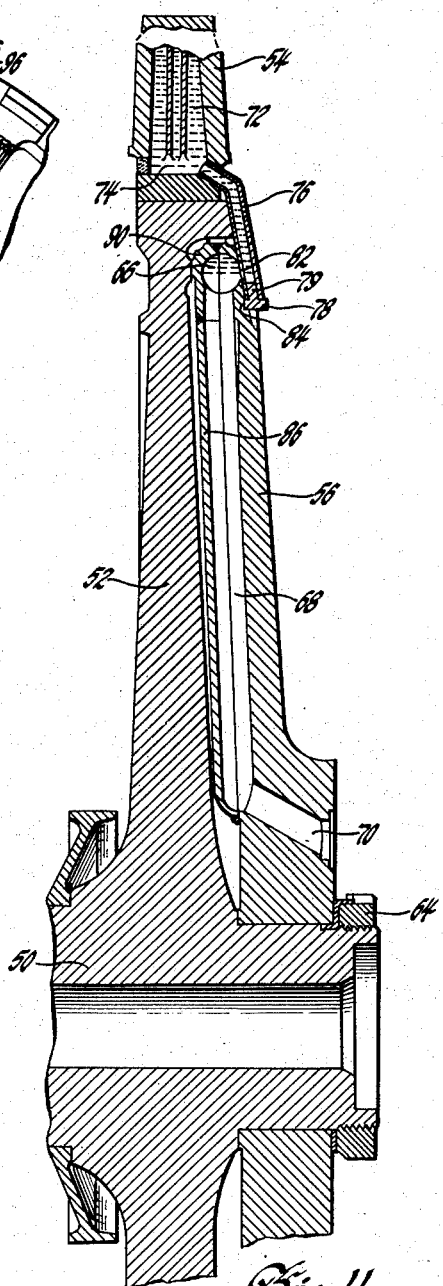
Figure 11 is an enlarged partial section of the turbine wheel and auxiliary wheel assembly.

Each of the buckets 54 is internally cored to provide a plurality of radially extending passages 72 that connect with a cross passage 74 formed in the root portion of the bucket as shown in Figure 11. Liquid coolant transfer tubes 76 are brazed into the rear walls of each of the bucket roots to connect the hollow interiors of the buckets with the vaporizing chamber 66. The transfer tubes 76 are sealed at their inner ends by plugs which have tab ends 78 and cylindrical portions 79 brazed in the tubes.

The auxiliary wheel 56 is milled to provide a row of skewed circumferentially spaced semi-cylindrical grooves 80 (Fig. 6) in its rear face. The grooves 80 are milled to a depth that will create passages 82 into the vaporizing chamber 66 and the transfer tubes 76 are each provided with a corresponding opening 83 so that communication may be established between the vaporizing chamber and the interior of the transfer tubes.

The inner ends of the transfer tubes 76 fit into the grooves 80 and the tab ends 78 of the transfer tube plugs fit into an annular groove 84 that is cut in the rear face of the auxiliary wheel 56 to anchor the transfer tubes against centrifugal force. The tabs 78 are tack welded to the auxiliary wheel 56 to secure the transfer tubes in the grooves 80 and 84 and the joints between the transfer tubes and the grooves 80 are soldered to seal the coolant connection to the buckets.

Referring now to Figures 8 through 11, it will be noted that the auxiliary wheel 56 is preferably constructed separately from the turbine wheel 52. The auxiliary wheel 56 therefore provides a separately stressed disk that supports all of the rotating members of the coolant distribution system except for the turbine buckets 54 which are supported on the turbine wheel disk 52. This construction is especially valuable as it enables conventional types of non-liquid cooled turbines to be readily provided with a liquid cooling system with only minor alterations in the structure of their turbine wheel disks. The auxiliary wheel will not stress the turbine wheel in such a modification, as it is separately stressed, and it is possible to continue the use of conventional methods of mechanically fastening the turbine buckets to the turbine wheel by providing the various turbine buckets with individual transfer tubes.

The radial passages 68 and the vaporizing chamber 66 are formed in the auxiliary wheel 56 by cutting half of the passages and the chamber into the disk and then welding the half tubular sections 86, 88 and 90 over the cut-in portions of the disk. The passages 70 are drilled through the heavier inner hub portion of the auxiliary wheel 56 and thereby the highly stressed outer portions of the wheel are not weakened.

In operation, coolant is delivered in liquid state to the vaporizing chamber 66 from the radial passages 68. The liquid coolant fills the interiors of the turbine buckets 54 and the transfer tubes 76 due to the rotation of the turbine rotor. The annular vaporizing chamber 66 insures an equalized delivery of liquid coolant to the various turbine buckets and is preferably supplied with only so much liquid as will result in the liquid reaching an intermediate level in the chamber as shown in Figure 11. The vaporizing chamber 66 is located in close proximity to the turbine buckets to reduce the liquid head due to centrifugal force to a minimum. The liquid coolant absorbs heat from the buckets and is continually vaporized, thereby cooling them. The vaporized coolant is displaced by the heavier incoming liquid coolant to the central portion of the auxiliary wheel 56 through the passages 68 and 70 which also conduct the incoming liquid coolant to the vaporizing chamber 66. The vaporized coolant is then drawn through the condensing system of Figure 1 and is returned as a liquid to the vaporizing chamber 66 to complete the coolant cycle. Thus vaporization of the coolant cools the turbine buckets, and the vaporized coolant acts as a medium to transfer the heat absorbed from the turbine buckets to the condenser where it may be removed from the system.

A pair of electrodes 92 and 94 (Fig. 10) are located at different radial locations in the vaporizing chamber 66 to control the liquid coolant level within the vaporizing chamber. The electrodes are suitably insulated from each other and from their supporting casing 96. The casing 96 may be threaded or otherwise secured to the inner wall of the vaporizing chamber 66. Referring additionally to Figure 1, the low level electrode 92 is connected by a lead 98 to the solenoid 100 while the high level electrode 94 is connected by a lead 102 to the solenoid 104. A suitable slip ring apparatus (not shown) is provided to connect the rotating and non-rotating sections of the leads 98 and 102. The solenoids 100 and 104 are connected to the battery 106 which has a common ground with the auxiliary wheel 56. The liquid level in the vaporizing chamber 66 will vary in operation and the liquid coolant is utilized as a conductive medium between the electrodes 92 and 94 and the grounded auxiliary wheel 56 to energize the solenoids 100 and 104 which control the flow of liquid coolant to the chamber, while the vaporized coolant is utilized as a non-conductive medium to deenergize the solenoids. Other means may be utilized to control the liquid level in the vaporizing chamber 66, if desired. For example, the solenoids 100 and 104 may be controlled by a pressure sensitive device that responds to changes in liquid head in the vaporizing chamber.

The coolant is circulated through the system by a pump 108 which may be driven in any suitable manner. The flow of liquid coolant to the vaporizing chamber is controlled by a manually operated valve 110 that is paralleled with an automatically operated valve 112. The valve 110 is initially set to deliver less liquid to the conduit 24 as would be required to maintain a liquid level in the vaporizing chamber 66 during normal operation. Additional liquid to maintain a desired liquid level range in the vaporizing chamber 66 is supplied by the opening and closing of the valve 112 in response to the rising and falling of the liquid level in the chamber. As the liquid rises to its highest level (that is, radially innermost) it immerses the electrode 94 to energize the solenoid 104 and close the normally open switch 118. The closing of the switch 118 energizes the closing solenoid 120 to actuate the valve controlling armature 122 and close the valve 112. The armature 122 is engaged by a spring detent 124 that holds the armature in the open and closed positions to which it is moved. As the liquid level recedes in the vaporizing chamber, the electrodes 94 and 92 successively emerge from the liquid coolant to deenergize the solenoids 104 and 100. Deenergizing of the solenoid 104 opens the switch 118 to deenergize the closing solenoid 120 and release the valve controlling armature 122. When the solenoid 100 is deenergized the normally closed switch 126 closes to energize the opening solenoid 128 to actuate the valve controlling armature 122 and open the valve 112 so that additional liquid coolant will be transmitted to the vaporizing chamber. The rapidity of cycling of the valve 112 may be varied by adjusting the manual valve 110, and a pair of low and high level signals 129 and 130 may be located in the pilot's compartment to furnish a visual indication of the cycling.

A pressure relief valve 132 is provided on the inlet side of the condenser 22 so that a desired vapor pressure may be maintained in the vaporizing chamber 66; and the pump 108 is supplied with a relief valve 134 so that excess liquid may be by-passed through the pump. The pump 108 also supplies a continuous flow of liquid coolant through the valve 136 and the conduit 138 to the liquid spin seal assembly 62 for use as a sealing liquid.

The spin seal assembly 62 (Figs. 2 through 5) includes the rotating coolant passage adapter 60 that terminates in an annular chamber member 140 that is essentially an enlargement of the rotating passage. The vapor outlet passage 20 includes a central passage 141 that is formed in a non-rotating portion of the spin seal assembly 62. The passage 141 terminates in a disk 142 that is located within the rotating chamber member 140. The disk 142 is essentially a flared end on the non-rotating passage 141. The sealing liquid from the conduit 138 is introduced into the vapor side of the rotating chamber member 140 through a passage 144 in the non-rotating disk 142. The sealing liquid is centrifuged to the outer portion of the chamber member 140 and prevents the vaporized coolant from leaking between the passage adapter 60 and the stationary conduit 20. The rotating chamber member 140 and the stationary disk 142 form an annular passage that acts like a U tube to seal the vaporized coolant which is at a higher pressure than the air in the cylindrical casing 40. The liquid inlet conduit 24 includes a stationary pipe 143 that delivers the liquid coolant to the rotating slinger 58 for distribution to the turbine buckets.

The disk 142 is also provided with a sealing liquid return passage 146 so that a continuous flow of sealing liquid may be maintained in the spin seal assembly to prevent an excessive accumulation of heat, and the excess sealing liquid is carried away with the vaporized coolant in the conduit 20. The seal capacity is a function of the effective rotational speed of the entrained sealing liquid and may be greatly increased by providing the rear inner wall of the chamber member 140 with a series of radially extending vanes 148 which may be clearly seen in Figure 5. The chamber member 140 is also provided with a groove 150 near its inside diameter which receives a lip on the disk 142 to prevent a loss of liquid at low internal pressures.

The spin seal assembly 62 is supported on the auxiliary wheel 56 and the non-rotating portion of the assembly is supported on the rotating cooling passage adapter 60 by a double row bearing 152 so that the chamber member 140 and the disk 142 will be maintained in perfect alignment. An oil spray is directed at the bearing 152 from the outlet 154 of the oil passage 156 and compressed air from the casing 40 is led into the spin seal assembly 62 at 158 to scavenge the oil from the bearings. The oil and air are exhausted out of the spin seal assembly by a conduit 159 and into the motive fluid stream at 160 as may be seen in Figures 2 and 3. A bracket 162 (Fig. 3) connects the stationary portion of the spin seal assembly to the casing 40 to restrain that portion from rotation. The connection allows relative expansion between the assembly and the casing so that assembly will be freely supported by the auxiliary wheel 56 and includes a pair of channels 164 and 166 that are welded to the interior of the casing 40 in spaced relation to each other to slidably receive the tongue 168 of the bracket 162.

The vaporized coolant conduit 20, the liquid coolant conduit 24, the sealing liquid conduit 138, the compressed air conduit 48 and the oil conduit 156 are led into the interior of the tail cone 36 through the streamlined telescopic struts 38. The liquid conduits 24, 138 and 156 loop around the spin seal assembly 62 so that they may be readily expanded without breaking by the intense heat of the motive fluid stream and also to prevent the transmission of undesirable forces between the casing 40 and the spin seal assembly whereby the non-rotating portion of the assembly is freely mounted on the double row bearing 152. The elbow portion 170 of the conduit 159 (Fig. 2) is slidable both radially and longitudinally with respect to the spin seal assembly for the same purpose. The vapor conduit 20 includes the bellows 172, the elbow 174, and the bellows 176. The elbow 174 is secured to a bracket 178 that extends across the interior of the casing 40. The bellows 172 also insures a free mounting of the spin seal assembly 62 and radial expansion is accommodated by the bellows 176.

The preferred embodiment of the invention has been described fully in order to explain the principles of the invention. It is to be understood that modification of structure may be made by the exercise of the skill in the art within the scope of the invention which is not to be regarded as limited by the detailed description of the preferred embodiment.

We claim:
1. An evaporative cooled turbine comprising an annular casing, means for effecting a flow of high temperature motive fluid in said casing, a rotatable shaft in said casing, a turbine wheel on said shaft, said shaft being supported for rotation on the upstream side of said turbine wheel, radially projecting turbine buckets disposed around the rim of said turbine wheel in the motive fluid flow path and having root portions mechanically affixed thereto, an auxiliary wheel on said shaft on the downstream side of said turbine wheel, liquid coolant chambers in said buckets, an annular coolant vaporizing chamber in said auxiliary wheel, liquid coolant transfer tubes on the downstream side of said turbine wheel connecting said bucket chambers with said wheel chamber, and means for removing said coolant in vapor phase from said vaporizing chamber and for returning said coolant in liquid phase to said vaporizing chamber.

2. An evaporative cooled turbine comprising an annular casing, means for effecting a flow of high temperature motive fluid in said casing, a rotatable shaft in said casing, a turbine disk on said shaft, said shaft being supported for rotation on the upstream side of said turbine disk, turbine buckets in the motive fluid flow path and having root portions dovetailed to the rim of said disk, liquid coolant chambers in said buckets having access openings through the downstream sides of said root portions, an auxiliary wheel on said shaft on the downstream side of said turbine wheel disk and having an annular coolant vaporizing chamber, liquid coolant transfer tubes on the downstream side of said turbine wheel disk connecting said access openings with said vaporizing chamber, and means for removing said coolant in vapor phase from said vaporizing chamber and for returning said coolant in liquid phase to said vaporizing chamber.

3. An evaporative cooled turbine comprising an annular casing, means for effecting a flow of high temperature motive fluid in said casing, a rotatable shaft in said casing, a turbine wheel on said shaft, said shaft being supported for rotation on the upstream side of said turbine wheel, radially projecting turbine buckets disposed around the rim of said turbine wheel in the motive fluid flow path and having root portions mechanically affixed thereto, an auxiliary wheel on said shaft on the downstream side of said turbine wheel, liquid coolant chambers in said buckets, an annular coolant vaporizing chamber in said auxiliary wheel, liquid coolant transfer tubes on the downstream side of said turbine wheel connecting said bucket chambers with said vaporizing chamber, and means for removing said coolant in vapor phase from said vaporizing chamber and for returning said coolant in liquid phase to said vaporizing chamber.

4. An evaporative cooled turbine comprising an annular casing, means for effecting a flow of high temperature motive fluid in said casing, a rotatable shaft in said casing, a turbine disk on said shaft, said shaft being supported for rotation on the upstream side of said turbine disk, turbine buckets in the motive fluid flow path and having root portions dovetailed to the rim of said disk, liquid coolant chambers in said buckets having access openings through the downstream sides of said root portions, an auxiliary wheel on said shaft on the downstream side of said turbine disk and having an annular coolant vaporizing chamber, liquid coolant transfer tubes on the down-stream side of said turbine disk connecting said access openings with said vaporizing chamber, and means for removing said coolant in vapor phase from said vaporizing chamber and for returning said coolant in liquid phase to said vaporizing chamber.

5. An evaporative cooled turbine comprising an annular casing, means for effecting a flow of high temperature motive fluid in said casing, a rotatable shaft in said casing, a turbine wheel on said shaft, said shaft being supported for rotation on the upstream side of said turbine wheel, radially projecting turbine buckets disposed around the rim of said turbine wheel in the motive fluid flow path and having root portions mechanically affixed thereto, liquid coolant chambers in said buckets having access openings through the downstream sides of said root portions, an auxiliary wheel on said shaft on the downstream side of said turbine wheel and having an annular outer coolant vaporizing chamber and an annular inner coolant distributing chamber connected thereto by radial coolant passages, liquid coolant transfer tubes connecting said access openings with said vaporizing chamber, and means for removing said coolant in vapor phase from said inner chamber and for returning said coolant in liquid phase to said inner chamber.

6. A turbine rotor comprising a rotatable turbine wheel, turbine buckets having root portions secured to the rim of said wheel, an annular groove in a side face of said wheel, a coolant chamber in said wheel, coolant chambers in said buckets, and coolant transfer tubes secured against said side face connecting said bucket chambers with said wheel chamber, said transfer tubes having tab portions secured in said groove.

7. A turbine rotor comprising a rotatable shaft, a turbine wheel on said shaft, turbine buckets having root portions secured to the rim of said wheel, an auxiliary wheel on said shaft, an annular groove in a side face of said auxiliary wheel, a coolant chamber in said auxiliary wheel, coolant chambers in said buckets, and coolant transfer tubes secured against said side face connecting said bucket chambers with said auxiliary wheel chamber, said transfer tubes having tab portions secured in said groove.

8. A turbine rotor comprising a rotatable shaft, a turbine wheel on said shaft, turbine buckets having root portions secured to the rim of said wheel, an auxiliary wheel on said shaft, an annular groove having generally radial grooving radiating therefrom in a side face of said auxiliary wheel, a coolant chamber in said auxiliary wheel, coolant chambers in said buckets, and coolant transfer tubes secured in said grooving connecting said bucket chambers with said auxiliary wheel chamber, said transfer tubes having tab portions secured in said annular groove.

References Cited in the file of this patent

UNITED STATES PATENTS

| | | |
|---|---|---|
| 1,657,192 | Belluzzo | Jan. 24, 1928 |
| 2,073,605 | Belluzzo | Mar. 16, 1937 |
| 2,339,779 | Holzworth | Jan. 25, 1944 |
| 2,369,795 | Planiol | Feb. 20, 1945 |
| 2,415,847 | Redding | Feb. 18, 1947 |
| 2,750,147 | Smith | June 12, 1956 |

FOREIGN PATENTS

| | | |
|---|---|---|
| 381,851 | Great Britain | Oct. 13, 1932 |
| 623,841 | Great Britain | May 24, 1949 |
| 897,716 | France | June 5, 1944 |